United States Patent [19]

Crews

[11] 3,904,947
[45] Sept. 9, 1975

[54] VEHICLE MOUNTED BATTERY CHARGING SYSTEM FOR AN ELECTRIC MOTOR VEHICLE

[76] Inventor: Roy E. Crews, 9412 Katherine Dr., Allison Park, Pa. 15101

[22] Filed: Aug. 22, 1973

[21] Appl. No.: 390,368

[52] U.S. Cl.................. 320/2; 180/65 BA; 307/10; 307/75; 318/139; 320/56
[51] Int. Cl.².................... H02J 7/00; B62D 45/00
[58] Field of Search.......... 320/2, 5, 15, 16, 40, 56, 320/43; 307/10, 75, 80, 81; 219/202; 180/65; 318/139, 376, 377; 339/32 M

[56] References Cited
UNITED STATES PATENTS

| | | | |
|---|---|---|---|
| 1,985,638 | 12/1934 | Kerr, Jr. et al. | 320/56 X |
| 1,988,192 | 1/1935 | Drabin | 320/43 X |
| 2,420,609 | 5/1947 | Mitchell | 320/56 |
| 3,217,225 | 11/1965 | Gottlieb et al. | 320/40 X |
| 3,270,267 | 8/1966 | Nolte, Jr. | 320/56 |
| 3,297,930 | 1/1967 | Payne | 318/139 UX |
| 3,474,296 | 10/1969 | Rickey | 320/40 X |
| 3,484,681 | 12/1969 | Grady, Jr. et al. | 320/48 X |
| 3,529,230 | 9/1970 | Tedd | 318/139 X |
| 3,560,832 | 2/1971 | Kirk | 320/15 |
| 3,673,379 | 6/1972 | Eversull | 219/202 |

*Primary Examiner*—J. D. Miller
*Assistant Examiner*—Robert J. Hickey

[57] ABSTRACT

A battery charging system is permanently installed on board an electric motor vehicle for enabling the vehicle batteries to be recharged from conveniently located alternating-current power outlets. Among other things, the vehicle mounted battery charging system includes an anti-driveaway interlock mechanism for preventing the driver from driving off in the vehicle while it is plugged into an alternating-current power outlet, a low charge lockout mechanism for preventing inadvertent use of the electric motor vehicle when the battery charge is below the level required for a journey of minimum distance and a charge rate selector mechanism for enabling the vehicle operator to select the length of charging time to be used.

1 Claim, 6 Drawing Figures

VEHICLE MOUNTED BATTERY CHARGING SYSTEM FOR AN ELECTRIC MOTOR VEHICLE

BACKGROUND OF THE INVENTION

This invention relates to battery charging systems for electric motor vehicles in general and battery-operated passenger automobiles in particular.

As is known, the storage batteries used to provide the power for running an electric motor vehicle need to be recharged fairly frequently. For the case of passenger type electric automobiles using lead-acid storage batteries, for examples, the automobile can be driven somewhere on the order of 50 to 70 miles before the batteries need to be recharged. In the past, the recharging has been done by driving the vehicle to a battery charging station or other location having the necessary battery charging equipment and hooking up the vehicle batteries to such equipment.

One of the drawbacks involved in recharging the batteries is that it takes so long. Typically, it takes somewhere on the order of eight hours to completely recharge a fully-discharged storage battery. Obviously, a good time for doing the recharging is at night when the vehicle is not in use. Thus, each owner of an electric motor vehicle should have the necessary battery charging equipment at home. The relatively lengthy time required also means that each automobile service station along the highway should have sufficient battery charging equipment to handle several electric motor vehicles at the same time. In addition, it would also be desirable to be able to at least partially recharge the batteries any time the electric vehicle is parked for any substantial length of time, like an hour or two or more. Thus, it would be desirable to have battery charging equipment located at business parking lots, hotel and restaurant parking lots, shopping centers and the like.

It thus becomes apparent that a tremendous amount of battery charging equipment would be required in order to handle a large number of electric motor vehicles using the foregoing approach.

The present invention provides an alternative solution which appears to be more advantageous, more flexible and less costly, at least as far as the total picture is concerned. In particular, a feature of the present invention is that the necessary battery charging equipment is permanently installed on board the electric motor vehicle. As a consequence, all that need be done is to plug the electric vehicle into an alternating-current electrical power outlet whenever it is desired to recharge the vehicle batteries. As can be appreciated, it would be much easier to provide a large number of alternating-current power outlets at the homes, in the parking lots and so forth than it would be to provide a like number of battery chargers. Also, only one battery charger per vehicle would be required. In addition, the problem of providing battery chargers capable of handling vehicles having different battery voltages would be eliminated.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENT

Figure 1:
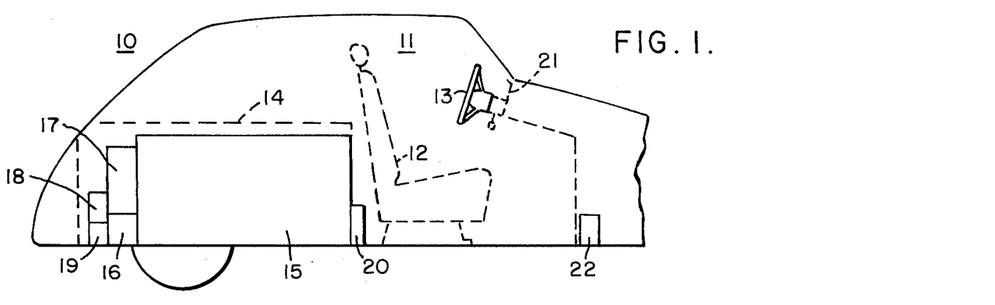
FIG. 1 shows in a general manner the way in which a battery charging system constructed in accordance with the present invention may be installed on board an electric passenger automobile.

Referring to FIG. 1, there is shown a passenger-type electric motor vehicle 10 having a passenger compartment 11, a driver's seat 12, a steering wheel 13 and a battery compartment 14. Located within the battery compartment 14 is a main vehicle traction battery 15 which provides the power for operating the direct-current traction motor (not shown) which propels the vehicle 10 and an auxiliary service battery 16 for operating the lights, horn and various other electrical devices and accessories on the vehicle 10. Traction battery 15 provide a relatively large output voltage on the order of, for example, 48 volts or more, while service battery 16 provides a relatively small output voltage on the order of, for example, 12 volts. Batteries 15 and 16 are rechargable storage batteries and, as such, may be of the lead-acid type, the nickel-iron type, the nickel-cadmium type or any other type suitable for use in propelling an electric motor vehicle.

When used in the present specification and claims, the following words shall have the following definitions and meanings: (1) the word "battery," when used in the singular, shall include the plural; and (2) the word "motor," when used in the singular, shall include the plural. Thus, as used herein, the word "battery" means and includes one or more batteries and the word "motor" means and includes one or more motors. Thus, for example, the traction battery 15, even though spoken of in the singular, may actually comprise several batteries connected in series or in parallel or some combination of the two. By way of further example, the vehicle traction motor may comprise two or more traction motors which may be connected in tandem or may, instead, be individually associated with different ones of the vehicle traction wheels.

Also located within the battery compartment 14 near the rear of the vehicle 10 are a battery charging and control unit 17, an alternating-current utility power receptacle 18 and an anti-driveaway interlock mechanism 19. An out-of-service switch 20 is located immediately behind the driver's seat 12 and various operator controls and indicator devices are located on a driver's control panel or dashboard 21. An electric heater 22 is located in the passenger compartment 11 near the front end thereof for purposes of heating the passenger compartment 11 during cold weather.

Figure 2:
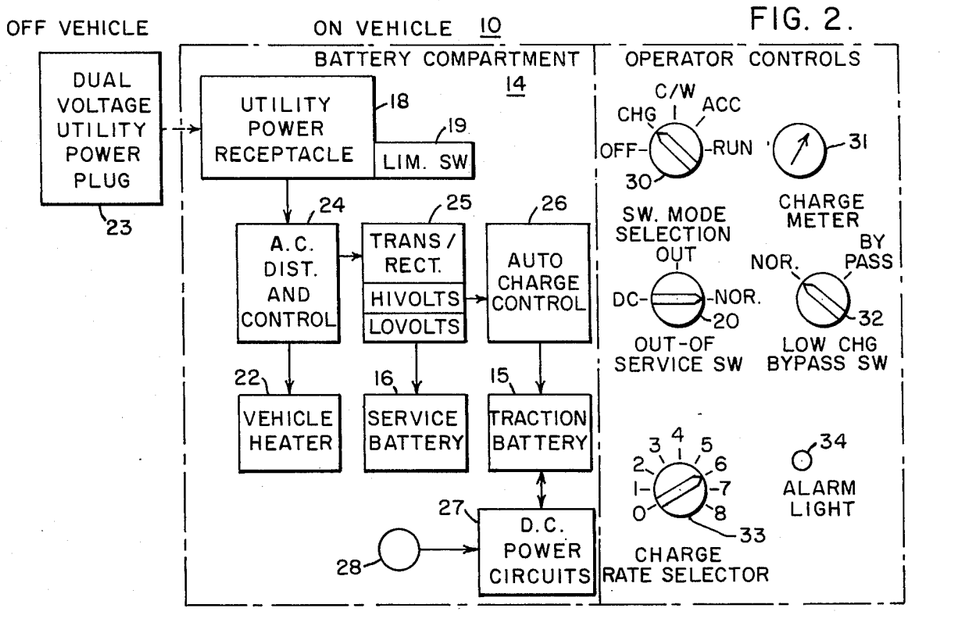
FIG. 2 is a block diagram showing the major components of the battery charging system of FIG. 1, their relationship to one another and their relationship to other on-vehicle and off-vehicle components.

As indicated in FIG. 2, the alternating-current power receptacle 18 is adapted to mate with an alternating-current power outlet located off of the vehicle 10 and represented by a dual voltage utility power plug 23. The alternating-current power receptacle 18 is connected to an alternating-current distribution and control system 24 which distributes alternating-current power received from the receptacle 18 to an alternating-current to direct-current power converter system 25 and to the vehicle heater 22. The power converter system 25 converts alternating-current power into direct-current power and supplies same by way of an automatic charge control unit 26 to the vehicle traction battery 15. The power converter system 25 also supplies direct-current power to the service battery 16. Direct-current power circuits 27 serve to connect the vehicle traction battery 15 to the vehicle traction motor (not shown). A shunt field rheostat 28 for the vehicle traction motor is associated with the direct-current power circuits 27. Units 24–28 of FIG. 2 are located within the battery charging and control unit 17 of FIG. 1.

FIG. 2 also shows various operator controls and indicator devices, most of which are located on the driver's control panel or dashboard 21 of FIG. 1. As seen in FIG. 2, these include a key-operated mode selection switch 30, a charge meter 31, a low charge bypass switch 32, a charge rate selector 33 and a low charge alarm light 34. As previously mentioned, the out-of-service switch 20 is located immediately behind the driver's seat 12. The key-operated switch 30 is a five position switch having an "OFF" position, a "CHG." (charge only) position, a C/W (charge/warm up) position, an "ACC." (accessory) position and a "RUN" (vehicle run) position. Charge meter 31 indicates the amount of charge remaining in the vehicle traction battery 15. Low charge bypass switch 32 enables the driver of the vehicle 10 to override an automatic lockout mechanism which automatically disconnects the vehicle traction battery 15 from the vehicle traction motor whenever the battery charge is below the level required for a journey of minimum distance. Charge rate selector 33 enables the vehicle operator to select a desired length of charging time when charging the vehicle traction battery 15 from an alternating-current power outlet. Low charge alarm light 34 lights up just before the automatic lockout mechanism disconnects the vehicle traction battery 15 from the vehicle traction motor.

Figure 3:
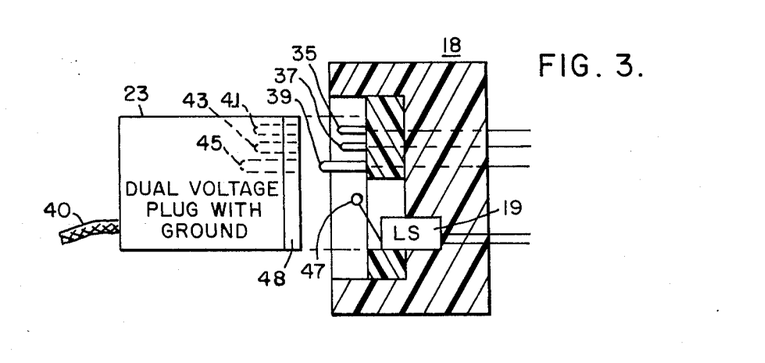
FIG. 3 shows in greater detail the construction of the vehicle mounted utility power receptacle of FIG. 2 and the limit switch mechanism associated therewith.

Referring now to FIG. 3, there is shown in greater detail the construction of the vehicle mounted alternating-current power receptacle 18, the anti-driveaway interlock mechanism 19 associated therewith and the alternating-current power outlet 23 located off of the vehicle 10. As indicated in FIG. 3, the power receptacle 18 is a plug-in type alternating-current connector for enabling the alternating-current power outlet 23 to be readily and easily connected to the motor vehicle 10. This alternating-current connector 18 includes a pair of low-voltage alternating-current contact members represented by prongs 35 and 36 (the latter being hidden behind the former), a pair of high-voltage alternating-current contact members represented by prongs 37 and 38 (the latter being hidden behind the former) and a ground contact member represented by prong 39. These prongs 35–39 are adapted to enter and make electrical contact with socket elements 41–45, respectively, located in the body of power outlet plug 23. The dual voltage alternating-current power outlet plug 23 is located at one end of a flexible multiconductor power cable 40, the other end of which is connected to an electric utility company alternating-current power system by way of, for example, the house wiring at the home of the owner of the electric motor vehicle 10. The conductors in the cable 40 are electrically connected to appropriate ones of the socket elements in the plug 23. Ground prong 39 is connected to the chassis of the motor vehicle, while the socket element 45 which receives the ground prong 39 is connected to the grounding system of the house wiring. Ground prong 39 is of greater length than the voltage prongs 35–38 so that such ground prong 39 will make connection with the plug 23 before connection is made by the voltage prongs 35–38. This insures that the vehicle 10 will be grounded before any alternating-current power is applied thereto.

The anti-driveaway interlock mechanism associated with the alternating-current connector 18 takes the form of a normally-closed limit switch 19 having a feeler arm 47 which is adapted to engage the socket face 48 of the power outlet plug 23. When the feeler arm 47 is extended as shown in FIG. 3, the limit switch 19 is closed. When the plug 23 is fully inserted into the receptacle 18, the feeler arm 47 is moved inwardly to open the limit switch 19. As will be seen, when the limit switch 19 is open, the vehicle traction battery 15 cannot be connected to the vehicle traction motor. This prevents the electric motor vehicle 10 from being driven away when the alternating-current connector 18 is connected to the alternating-current power outlet 23.

As shown in FIG. 3, the power outlet plug 23 is located at the end of a flexible power cable 40. As an alternative embodiment, the plug 23 may be instead mounted in a stationary manner and the vehicle receptacle 18 located at one end of a flexible power cable, the other end of which is connected to the alternating-current distribution and control circuit 24. In either case, an access door (not shown) is provided at the rear of the vehicle 10 for enabling the plug 23 to be plugged into the receptacle 18.

The battery charging system further includes a first converter system located on the electric motor vehicle 10 and connected to the alternating-current connector 18 for converting alternating-current power into direct-current power for use in charging the vehicle traction battery 15. This converter system is shown in a general manner in FIG. 4 and in a more detailed manner in FIG. 5. With reference to FIG. 5, the converter system includes an iron core power transformer 50 having primary windings 51, 52 and 53 and secondary windings 54, 55 and 56. Primary windings 51 and 52 are connected in parallel with one another and this parallel combination is connected across the low-voltage contact prongs 35 and 36 of the alternating-current connector 18. Connected in series between the prong 36 and the upper ends of the primary windings 51 and 52 are a protective fuse 57 and a normally-closed contact element 58. The third primary winding 53 is connected across the high-voltage contact prongs 37 and 38 of the connector 18, a protective fuse 59 and a normally-open contact element 60 being connected in series between the prong 38 and the lower end of the winding 53. The low voltage contact prongs 35 and 36 are adapted to receive an alternating-current voltage having a nominal value of, for example, 110 volts, while the high voltage contact prongs 37 and 38 are adapted to receive an alternating-current voltage having a nominal value of, for example, 220 volts. Normally, one or the other, but not both, of these voltages will be present at any given moment.

The converter system further includes a rectifier 61 having its input side connected to the secondary winding 54 of the transformer 50. Rectifier 61 includes a bridge type rectifier circuit 62 and a smoothing filter formed by a choke coil 63 and a capacitor 64. When an alternating-current voltage is being received by the connector 18, a direct-current voltage is produced across rectifier output terminals 65 and 66 for use in charging the traction battery 15.

Also connected across the secondary winding 54 of transformer 50 is the primary winding of a further transformer 67 which, as will be seen, forms part of a second converter system for use in charging the service battery 16. A direct-current power supply 68 is connected across the secondary winding 55 for producing a regulated low-voltage direct-current voltage which is used to energize certain logic circuits associated with the charge control unit 26. The third secondary winding 56 forms part of the alternating-current distribution and control circuit 24 and, as such, supplies alternating-current voltage by way of terminals 70 and 71 to various alternating-current devices to be discussed hereinafter.

As further seen in FIG. 5, the battery charging system also includes switch means, represented by the contact elements 58 and 60, for selectively connecting one or the other but not both pairs of the alternating-current prongs 35–36 and 37–38 to the converter transformer 50. To this end, the contact elements 58 and 60 are mechanically interconnected such that one or the other but not both of them can be closed at any given instant. In connection therewith, the battery charging system further includes automatic control means for determining which of the alternating-current voltages is present and controlling the switch means 58 and 60 to supply same to the converter transformer 50. In the present embodiment, this automatic control means is represented by a relay coil 72 which is mechanically connected to the same mechanical linkage which interconnects the contact elements 58 and 60.

When no high voltage is present between the contact prongs 37 and 38, the relay coil 72 remains unenergized and the contact elements 58 and 60 remain in the positions shown in FIG. 5, namely, with contact element 58 closed and contact element 60 open. When, on the other hand, a high voltage is present between the contact prongs 37 and 38, the relay coil 72 is energized to reverse the conditions of the contact elements 58 and 60. This opens the contact element 58 and closes the contact element 60 to enable the high voltage to energize the primary winding 53. If, by some happenstance, both the high and low voltages should be present at the same time, then relay coil 72 allows only the high voltage to be applied to the transformer 50.

Figure 4:
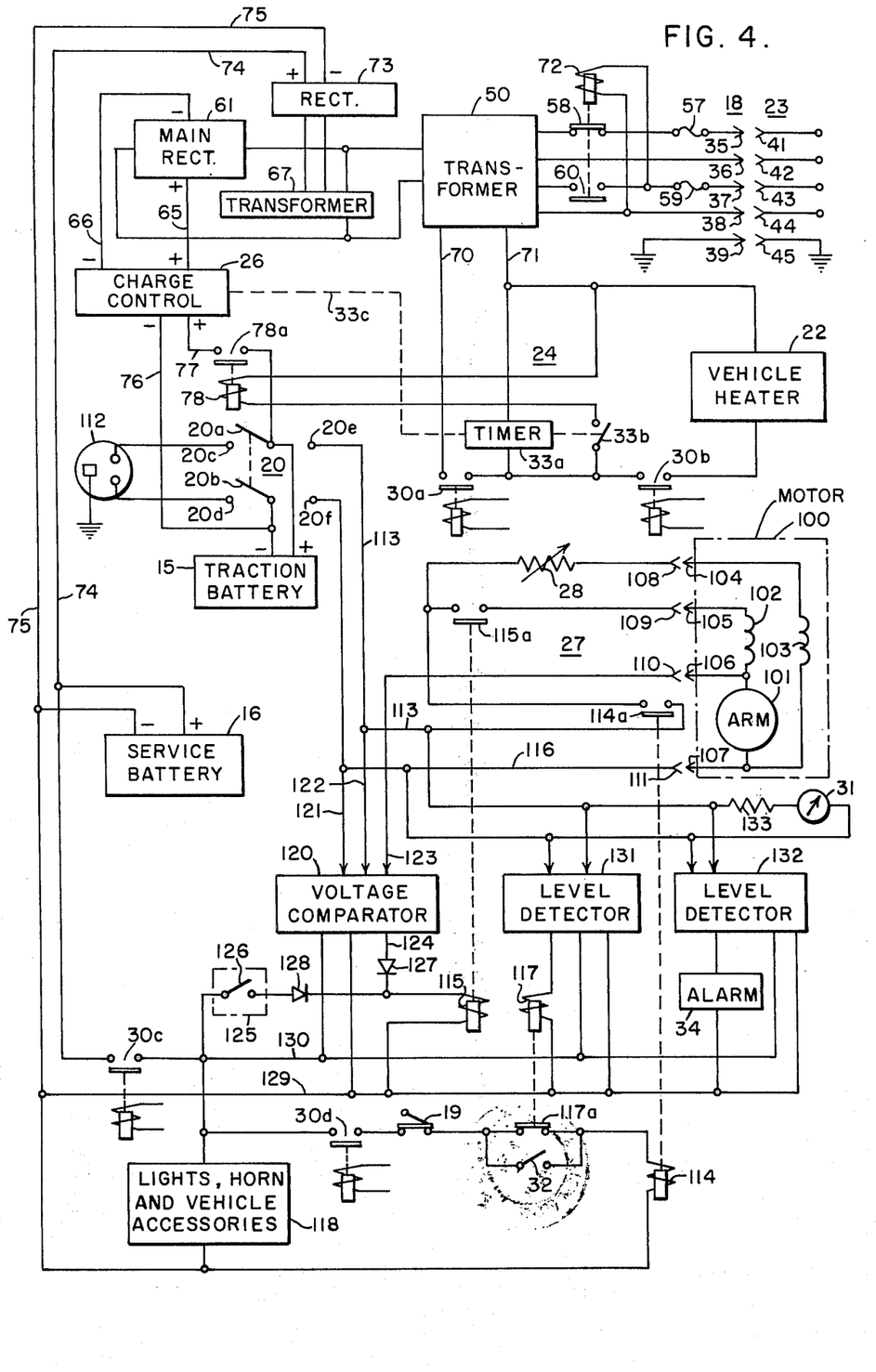
FIG. 4 is a schematic electrical wiring diagram for the battery charging system of FIG. 2.
Figure 5:
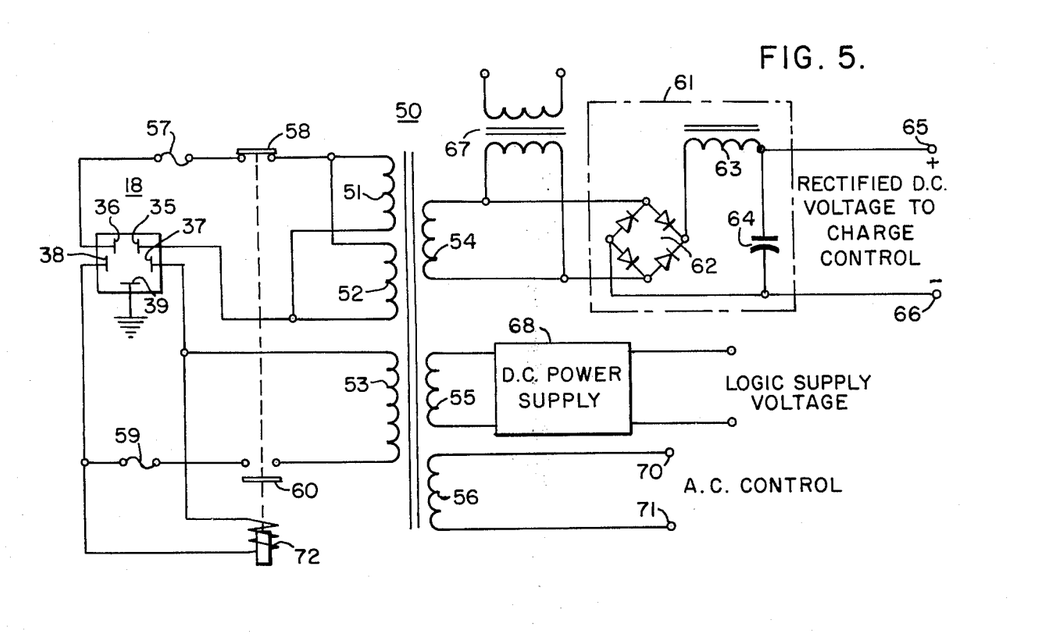
FIG. 5 is a schematic electrical wiring diagram showing in greater detail the manner of construction of an alternating-current to direct-current power converter circuit suitable for use in the system shown in FIGS. 2 and 4.

Referring now to FIG. 4, the transformer 50, rectifier 61 and transformer 67 are there shown in block form. The transformer 67 forms part of a second converter system located on the electric motor vehicle 10 and responsive to the alternating-current power received by the alternating-current connector 18 for converting same into direct-current power for use in charging the service battery 16. To this end, the transformer 67 is connected to a rectifier 73, the output of which is connected by way of conductors 74 and 75 to the service battery 16. Among other reasons, a separate converter system is used for the service battery 16 because, as indicated above, the voltage rating of such service battery 16 is substantially different from the voltage rating of the traction battery 15.

The battery charging system further includes a charge control system located on the electric motor vehicle 10 for supplying direct-current energy from the converter system represented by transformer 50 and rectifier 61 to the vehicle traction battery 15 at a controlled rate. This charge control system includes the charge control unit 26, the input side of which is coupled to the rectifier 61 by conductors 65 and 66. The negative output terminal of the charge control unit 26 is connected by way of a conductor 76 to the negative terminal of the traction battery 15. The positive output terminal of the charge control unit 26 is connected by way of a conductor 77, a normally-open contact element 78a and a conductor 79 to the positive terminal of the traction battery 15. Contact element 78a is controlled by an actuator coil 78, these two elements forming a contactor assembly for controlling the connection of the charge control unit 26 to the traction battery 15.

The charge control system also includes the charge rate selector 33 (FIG. 2) located on the vehicle dashboard 21 (FIG. 1) and a timer 33a (FIG. 4) which is mechanically linked therewith. In other words, the control knob of charge rate selector 33 sets the timer 33a. Charge rate selector 33 is preferably calibrated in "hours," such term denoting the length of the time interval over which the battery 15 is to be charged. As indicated in FIG. 4, the timer 33a is an electrical timer which is adapted to be electrically energized by alternating current supplied by way of output conductors 70 and 71 coming from the transformer 50. A normally-open contact element 30a associated with the key-operated switch 30 (FIG. 2) determines whether the alternating current reaches the timer 33a. Timer 33a controls a contact element 33b which is connected in series with the charge control actuator coil 78. Timer 33a is also coupled to the charge control unit 26 by way of a linkage 33c. The vehicle electric heater 22 is also connected to the alternating-current conductors 70 and 71 by way of the contact element 30a and a second normally-open contact element 30b also associated with the key-operated switch 30.

When the key-operated switch 30 (FIG. 2) is in the "OFF" position, both of the contact elements 30a and 30b are in their normally-open condition. When the key-operated switch 30 is set to the "CHG." (charge only) position, the contact element 30a is closed. This energizes the timer 33a. When the key-operated switch 30 is set to the "C/W" (charge/warm up) position, both of the contact elements 30a and 30b are closed. This energizes both the timer 33a and the vehicle heater 22. If the alternating-current connector 18 is not plugged into an alternating-current outlet, then neither the timer 33a nor the vehicle heater 22 will be energized regardless of the conditions of contact elements 30a and 30b.

Assuming that the connector 18 is plugged into an alternating-current outlet and that the key-operated switch 30 is in either the "CHG." or the "C/W" position, then the setting of the charge rate selector 33 to a non-zero position causes the timer 33a to close the timer contact element 33b. This enables alternating current to flow through the charge control actuator coil 78 which, in turn, causes the actuator coil 78 to close the contact element 78a. This connects the charge control unit 26 to the traction battery 15 for purposes of charging same. Timer contact element 33b and, hence, charge control contact element 78a remain closed for the length of time established by the setting of the charge rate selector 33. At the end of this time interval, the timer 33a returns the timer contact element 33b to its open condition which, in turn, causes the charge control contact element 78a to open. Thus, for example, if the charge rate selector 33 is set to a 6 hour position, the charge control unit 26 will remain connected to the traction battery 15 for a period of 6 hours, after which it will be automatically disconnected therefrom by the opening of contact elements 33b and 78a. Thus, charge rate selector 33 enables the vehicle operator to select a desired length of charging time, and, as will be seen, the charge rate is adjusted to suit this time interval.

Figure 6:
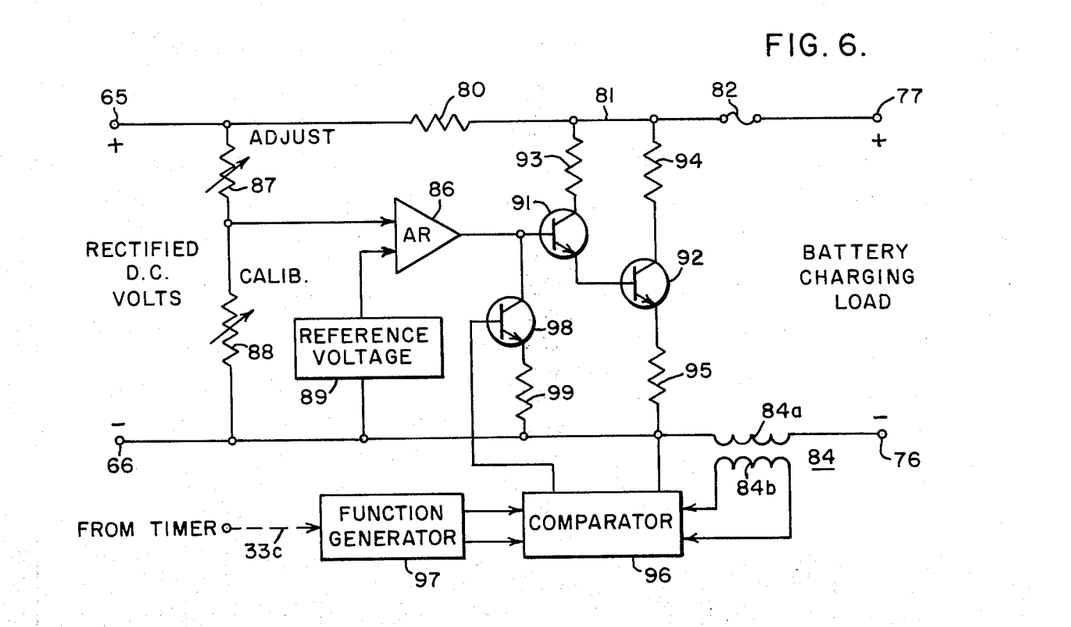
FIG. 6 is a schematic electrical wiring diagram showing the manner of construction of a charge control unit suitable for use in the system shown in FIGS. 2 and 4.

Referring now to FIG. 6, there is shown a suitable manner of construction for the charge control unit 26. Among other things, this charge control unit 26 automatically adjusts the charging rate to provide optimum charging action for the length of time selected for charging. In discussing FIG. 6, it is assumed that the alternating-current connector 18 is plugged into an alternating-current outlet, that the key-operated switch 30 is set to the "CHG." position and that the charge rate selector 33 is set to a non-zero position. This means that direct-current power is being supplied to the input terminals 65 and 66 of the charge control unit 26 and that the output terminals 76 and 77 of the charge control unit 26 are connected to the traction battery 15.

As seen in FIG. 6, the positive input terminal 65 of charge control unit 26 is connected to the positive output terminal 77 of such unit by way of a resistor 80, a conductor 81 and a protective fuse 82. The negative input terminal 66 is connected to the negative output terminal 76 by way of a conductor 83 and a low impedance primary winding 84a of a current sensing transformer 84.

The charge control unit 26 further includes a negative feedback type control loop for regulating the voltage and current supplied to the output terminals 76 and 77 and, hence, to the traction battery 15. This control loop includes a differential amplifier 86 and a voltage divider formed by adjustable resistors 87 and 88, this voltage divider being connected across the input terminals 65 and 66. The junction between resistors 87 and 88 is connected to a first input terminal of the amplifier 86. A reference voltage element 89 is connected between a second input terminal of amplifier 86 and the lower conductor 83. The output terminal of amplifier 86 is connected to and controls a variable impedance shunt circuit 90 which shunts the charge unit output terminals 76 and 77. The shunt circuit 90 includes a pair of transistors 91 and 92. Transistor 91 has its base electrode connected to the output terminal of the amplifier 86, its collector electrode connected by way of a resistor 93 to the upper conductor 81 and its emitter electrode connected to the base electrode of the second transistor 92. The second transistor 92 has it collector electrode connected by way of a resistor 94 to the upper conductor 81 and its emitter electrode connected by way of a resistor 95 to the lower conductor 83.

The second winding 84b of the current sensing transformer 84 is connected to a first pair of input terminals of a signal comparator circuit 96. A second pair of input terminals of the comparator circuit 96 receives a time-varying direct-current signal from a function generator 97. Function generator 97 is controlled by the linkage 33c coming from the timer 33a (FIG. 4). One output terminal of the comparator 96 is connected to the base electrode of a third transistor 98, while the other output terminal is connected to the lower conductor 83. The collector electrode of transistor 98 is connected to the output terminal of the amplifier 86, while the emitter electrode of transistor 98 is connected by way of a resistor 99 to the lower conductor 83. Amplifier 86, reference voltage unit 89, comparator 96 and function generator 97 receive their operating power from the direct-current power supply 68 shown in FIG. 5.

Amplifier 86 compares the voltage at the junction between resistors 87 and 88 with the reference voltage 89. If these two voltages are not equal, then amplifier 86 supplies a signal to the transistor 91 to control same to adjust the collector to emitter impedance of the transistor 92. This adjusts the magnitude of the current flowing from the upper conductor 81, through resistor 94, transistor 92 and resistor 95 to the lower conductor 83. The change in magnitude of this current changes the magnitude of the voltage appearing between the charge unit input terminals 65 and 66 and makes the voltage at the junction between resistors 87 and 88 very nearly equal to the reference voltage 89. This control action holds the magnitude of the voltage appearing between the charge unit input terminals 65 and 66 substantially constant. In the absence of other circuit actions, this also causes the voltage appearing between charge unit output terminals 76 and 77 to remain substantially constant.

Function generator 97 produces a time-varying direct-current signal which varies in the manner in which it is desired that the charging current to the traction battery 15 should vary with time. There appears across the secondary winding 84b of the current sensing transformer 84 a signal which varies in the manner in which the traction battery charging current is actually varying with time. These desired and actual signals are compared by the comparator 96 and, if necessary, comparator 96 adjusts the bias on the base electrode of the transistor 98 to control the transistors 91 and 92 to compensate for any difference in the actual and desired values for the battery charging current. This regulates the charging current to the traction battery 15 to provide the desired charging rate for the conditions at hand.

Returning to FIG. 4, there will now be considered the manner in which the traction battery 15 is connected to the vehicle traction motor. Except where otherwise noted, it will be assumed that the alternating-current connector 18 is not plugged into an alternating-current outlet and, hence, that the charge control unit 26 is not connected to the traction battery 15 because of the charge control contact element 78a being in an open condition. With this in mind, it is first noted that the traction battery 15 is selectively connected to the vehicle traction motor, represented schematically at 100, by the out-of-service switch 20. Traction motor 100 is a direct-current traction motor having an armature 101, a series field winding 102 and a shunt field winding 103. The rotary shaft of the armature 101 is geared or otherwise mechanically coupled to the drive wheels of the vehicle 10 for purposes of propelling same down the roadway. Traction motor 100 is provided with appropriate male connector contacts 104, 105, 106 and 107 which are adapted to engage corresponding ones of female connector contacts 108, 109, 110 and 111, respectively, the latter being connected to the direct-current power circuits 27 which run to the traction battery 15. The traction motor 100 per se is not novel. Various forms of direct-current traction motors are well known in the art and the particular form shown in FIG. 4 is intended only as being typical.

The out-of-service switch 20 is a double pole, double throw switch having a pair of movable switchblades 20a and 20b which are mechanically ganged to one another, a first pair of stationary contacts 20c and 20d and a second pair of stationary contacts 20e and 20f. The first pair of contacts 20c and 20d are connected to a direct-current connector 112 and the second pair of stationary contacts 20e and 20f are connected to the traction motor 100. The movable switchblades 20a and 20b are individually connected to the positive and negative terminals, respectively, of the traction battery 15.

The direct-current connector 112 is located on the motor vehicle 10 and constitutes means for enabling a connection to be made to a direct-current power outlet located off of the vehicle 10 for enabling a fast charging of the traction battery 15. This, of course, can only occur when the out-of-service switch 20 is set to the left-hand position such that switchblades 20a and 20b engage the contacts 20c and 20d, respectively. This setting corresponds to the "DC" position shown in FIG. 2 for the switch 20. The "OUT" (out-of-service) position of FIG. 2 corresponds to the case where the switchblades 20a and 20b do not engage either set of the stationary contacts. The "NOR." (normal) position of FIG. 2 corresponds to the case where the switchblades 20a and 20b are set to the right-hand position so as to engage contacts 20e and 20f respectively. This normal position is, of course, the one used when it is desired to drive the motor vehicle 10 down the roadway. For the remainder of this discussion, it will be assumed that the switch 20 is in the normal position.

With the switch 20 in the normal (right-hand) position, the positive terminal of traction battery 15 is connected by way of conductor 79, switchblade 20a, contact 20e, conductor 113, normally-open contact element 114a, normally-open contact element 115a and connector contact 109 to the traction motor 100. In this regard, it is hereinafter assumed that male contacts 104–107 are in engagement with female contacts 108–111, respectively. The negative terminal of traction battery 15 is connected by way of switchblade 20b, stationary contact 20f, conductor 116 and connector contact 111 to the traction motor 100.

Associated with the direct-current power circuits 27 is an adjustable resistor device, represented by the shunt field rheostat 28, which is connected in series with the vehicle traction battery 15 and the shunt field winding 103 of the motor 100 for enabling adjustment of the speed/torque relationship of the traction motor 100 to suit local driving conditions. More particularly, rheostat 28 is connected between the junction between contact elements 114a and 115a and the female connector contact 108. The adjustment of the rheostat 28 is somewhat akin to the adjustment of the carburetor on a motor vehicle powered by a gasoline engine to suit local driving conditions. In particular, one setting of the rheostat 28 will provide better operation over hilly-type terrain, while another setting will provide better operation over a fairly flat terrain. In other words, one setting will enable the motor 100 to develop greater torque, while another setting will enable the motor 100 to develop greater speed. Rheostat 28 accomplishes this purpose by strengthening or weakening the field produced by the shunt field winding 103, the selected field strength being chosen to provide the best comprise for the local driving conditions.

Even though switch 20 is set to the right-hand position, several additional conditions must be met before the electric motor vehicle 10 is capable of moving under its own power. In particular, the two normally-open contact elements 114a and 115a must both be closed. Considering first the contact element 114a, such contact element 114a is part of a run contactor assembly and as such is controlled by an actuator coil 114. When actuator coil 114 is not energized, contact element 114a is open. Conversely, when actuator coil 114 is energized, contact element 114a is closed. The status of actuator coil 114 is dependent on the status of the normally-open contact elements 30c and 30d associated with the key-operated switch 30, the normally-closed anti-driveaway limit switch 19 and a normally-closed contact element 117a associated with a low charge lockout mechanism. Assuming lockout bypass switch 32 to be open, then all four of the contact elements 30c, 30d, 19 and 117a must be closed in order for the run contactor actuator coil 114 to be energized. When so closed, the actuator coil 114 is energized by direct current flowing from the service battery 16.

Contact element 30c is closed when, and only when, the key-operated switch 30 is set to either the "ACC." (run/ready) position or the "RUN" position. With the contact element 30c closed, direct current can flow from the service battery 16 to the lights, horn and other electrical devices and accessories (indicated collectively at 118) on board the vehicle 10 whenever such devices and accessories are turned on or otherwise actuated. The contact element 30d is closed when, and only when, the key-operated switch 30 is set to the "RUN" position. Thus, this setting of the key-operated switch 30 is a necessary prerequisite before the vehicle 10 can run under its own power.

The anti-driveaway limit switch 19 is a protective-type interlock mechanism to prevent the motor vehicle 10 from being driven off while the alternating-current battery-charing connector 18 is plugged into an alternating-current power outlet. In other words, and with reference for the moment to FIG. 3, the limit switch 19 is in its normally closed condition when the connector 18 is not connected to the alternating-current outlet plug 23. On the other hand, when the connector 18 is connected to the power plug 23, then the limit switch 19 is switched to its open condition. This is accomplished by the inward movement of the switch feeler arm 47 under the urging of the socket face 48 of the plug 23 when the plug 23 is inserted into the receptacle 18. As indicated in FIG. 4, the opening of limit switch 19 prevents energizing of the run contactor coil 114 and, hence, prevents closure of the run contact element 114a. Feeler arm 47 is spring-loaded or otherwise resiliently biased so that it will automatically return to its extended condition when the plug 23 is removed.

The operation of the low-charge lockout contact element 117a will be discussed later and, for the moment, it will be assumed that such contact element 117a is in its closed condition.

The key-operated switch 30 is a multi-position rotary selector switch which may take the form of, for example, a cross-bar, cam operated or deck-type switch assembly. Each of the four contact elements 30a, 30b, 30c and 30d has associated therewith its own individual actuator coil, each such contact element and coil combination comprising a separate contactor assembly. The individual actuator coils are, in turn, wired to the contact elements of the multi-position switch 30 so that each is energized only at the desired switch positions or switch settings. These wiring details have been omitted for sake of simplicity. As an alternative form of construction, the actuator coils may be omitted and the contact elements 30a-30d located directly on the switch 30 for closure by the wiper element or elements of such switch 30. In this case, however, care must be taken that the switch elements are capable of handling the currents that may be drawn by the different items connected in series with the different contact elements.

The battery charging system of the present invention further includes a regenerative battery charging system for enabling the vehicle traction motor 100 to supply energy to the vehicle traction battery 15 when the motor vehicle 10 is going downhill or slowing down or decelerating. In these situations, the motor 100 will, at times, be acting like an electrical generator. When this occurs, it is desirable to use the electrical energy generated in this manner to charge the traction battery 15. This, of course, extends the operating range of the motor vehicle 10 between recharges from an external source.

The regenerative battery charging system includes the contact element 115a connected in series with the armature winding 101 of the vehicle traction motor 100 and the vehicle traction battery 15. This contact element 115a is controlled by an actuator coil 115. The regenerative battery charging system also includes a voltage comparator 120 for comparing the traction battery terminal voltage and the traction motor armature voltage and producing a distinctive electrical indication or signal whenever the armature voltage is greater than the battery terminal voltage. Whenever this occurs, that is, whenever the voltage across armature 101 is greater than the terminal voltage of battery 15, then it is desired that the contact element 115a be closed so that the greater armature voltage may charge the battery 15.

To obtain the desired comparison, input leads 121 and 122 of the comparator 120 are connected to circuit points which are connected to the two terminals of the traction battery 15. For the same reason, input leads 121 and 123 of the comparator 120 are connected to circuit points which are connected to the two sides of the armature 101. When the armature voltage is greater than the battery voltage, the voltage comparator 120 produces a distinctive electrical indication on an output lead 124, which electrical indication is different from any that may be produced when the armature voltage is less than the battery voltage. In the present embodiment, the voltage level on output lead 124 is zero when the armature voltage is less than the battery voltage and assumes some substantial positive value, say, 12 volts, when the armature voltage is greater than the battery voltage.

The operation of the contact element 115a is also correlated with the operation of the vehicle accelerator mechanism (not shown). Such accelerator mechanism includes an accelerator signaling device 125 for producing a distinctive electrical indication whenever the vehicle accelerator mechanism is in an accelerate position. This signaling device 125 includes a normally-open switch 126 which is closed whenever the driver of the vehicle 10 is depressing the accelerator pedal. When the accelerator pedal is not depressed, the switch 126 is open.

The regenerative battery charging system further includes circuit means responsive to the electrical indications produced by the voltage comparator 120 and the accelerator signaling device 125 for controlling the contact element 115a for closing such contact element 115a only when either the motor armature voltage is greater than the traction battery terminal voltage or the vehicle accelerator mechanism is in an accelerate position (accelerator pedal depressed). This circuit means includes the actuator coil 115 and a pair of diodes 127 and 128.

When a positive voltage appears on the output lead 124 of the voltage comparator 120, direct current flows by way of the diode 127, through the actuator coil 115 and to a negative voltage supply conductor 129 which runs to the negative side of the service battery 16. This energizing of the coil 115 closes the contact element 115a. This occurs whenever the motor armature voltage is greater than the traction battery terminal voltage.

When the accelerator signaling switch 126 is closed, direct current flows from a positive voltage supply conductor 130, through the switch 126, the diode 128 and the actuator coil 115 and to the negative voltage supply conductor 129. The positive voltage supply conductor 130 is connected to the positive terminal of the service battery 16, provided that the key switch contact element 30c is closed. This flow of current by way of the accelerator signaling switch 126 energizes the coil 115 to close the contact element 115a. This occurs whenever the vehicle accelerator pedal is depressed.

As seen from the foregoing (and assuming the run contact element 114a to be closed), the regenerative charging contact element 115a is closed to connect the motor 100 to the battery 15 whenever the vehicle accelerator pedal is depressed. This is necessary to enable the battery 15 to energize the motor 100 to obtain movement of the motor vehicle 10. When the motor vehicle 10 is going down hill or slowing down or decelerating, the vehicle accelerator mechanism will usually not be depressed. Nevertheless, the voltage comparator 120 acts to keep the contact element 115a closed at this time, provided the armature voltage is greater than the traction battery terminal voltage. This enables energy to be returned to the traction battery 15. When the point is reached where the motor armature voltage falls below the traction battery terminal voltage, the contact element 115a is opened to prevent unnecessary drain on the traction battery 15.

It is to be carefully noted that the vehicle speed control circuits, direction reversing circuits, and other motor control circuits normally used in connection with a vehicle traction motor have been purposely omitted from the drawings of the present application. Motor control circuits of this type are well known in the art and are separate and distinct from the present invention. Thus, they are omitted both to emphasize this distinction and to simplify the present discussion. Should the reader desire further information with respect to same, reference can be had to the technical paper entitled "Control and Charging Systems for Electric Vehicles" written by David Gurwicz and appearing at pages 187–227 of the *Proceedings Of The Second International Electric Vehicle Symposium* (November 8–10, 1971) published by the Electric Vehicle Council, 90 Park Avenue, New York, New York 10016. It is assumed herein that such motor controls are present on the vehicle 10 and are connected to the traction motor 100 in the appropriate manner. The information and descriptions set forth in this technical paper are hereby incorporated in this application by the foregoing reference thereto.

Considering now the low-charge lockout mechanism, such mechanism includes a lockout device for disconnecting the vehicle traction battery 15 from the traction motor 100. This lockout device includes the contact element 117a and the actuator coil 117 which controls same. The lockout mechanism also includes a battery charge sensor device for controlling the lockout device for disconnecting the vehicle traction battery 15 from the traction motor 100 whenever the battery charge of the battery 15 is below the level required for a journey of predetermined minimum distance. This includes a level detector 131 which monitors the voltage level across the terminals of the traction battery 15. As is known, the terminal voltage of a storage battery decreases as it becomes more discharged. So long as the terminal voltage of battery 15 remains above the critical level, actuator coil 117 remains de-energized and the contact element 117a remains in its normally-closed condition. When the battery terminal voltage reaches or falls below the critical level, level detector 131 energizes the coil 117 to open the contact element 117a. This deenergizes the run contactor coil 114 to return the run contact element 114a to its normally-open condition. This disconnects the battery 15 from the motor 100 to prevent further operation of the latter.

The critical level for level detector 131 is selected so that the lockout actuator coil 117 is energized when the battery charge falls below that required to propel the vehicle 10 a distance of, for example, one-tenth of the normal vehicle driving range. For a normal driving range of, for example, 50 miles, this means that the lockout coil 117 will be energized whenever the battery charge of battery 15 is not sufficient to propel the vehicle 10 a distance of at least 5 miles. Among other things, this lockout mechanism prevents the driver from getting into the vehicle 10 and driving away when there is relatively little charge left in the battery 15. The driver however, has the option of overriding the low-charge lockout mechanism, which option is exercised by closing the lockout bypass switch 32. As previously mentioned, this bypass switch 32 is located on the vehicle dashboard 21.

The battery charging system also includes a second level detector 132 which controls a low-charge alarm light 34. As with the first level detector 131, this second level detector 132 also monitors the terminal voltage of the traction battery 15. The critical level in level detector 132, however, is set so that the alarm 34 is energized shortly before, for example, one mile before, the lockout coil 117 is energized. This is useful when driving on a busy roadway. It forewarns the driver that the automatic lockout mechanism is about to disconnect the motor from the battery. It thus enables the operator or driver to exercise his option of closing the lockout bypass switch 32 before the lockout contact element 117a actually opens. This prevents any unexpected interruption in the flow of electrical power to the motor 100.

Voltage comparator 120, level detector 131 and level detector 132 receive their operating power from the service battery 16 by way of the voltage supply conductors 129 and 130.

As previously indicated, the battery charging system also includes a charge meter 31 (FIG. 2) located on the driver's control panel or dashboard 21 for indicating the amount of charge remaining in the vehicle traction battery 15. In the present embodiment, the quantity monitored for purposes of determining the amount of battery charge is the battery terminal voltage. Thus, as indicated in FIG. 4, the meter 31 is connected in series with a resistor 133 to form a voltmeter circuit which is connected to appropriate circuit points so as to measure the terminal voltage of the traction battery 15. In this regard, resistor 133 has a relatively high resistance value. As an alternative embodiment, the foregoing voltmeter arrangement may be omitted and the charge meter 31 instead connected to a device which senses the specific gravity of the battery fluid in the traction battery 15. As is known, the specific gravity of the battery fluid also decreases as a storage battery becomes more discharged.

As seen from the foregoing discussions, the electric motor vehicle 10 can have its batteries recharged from a conveniently located alternating-current power outlet. The operator of vehicle 10 can select the optimum charge rate for the length of time available for charging. Provision is also made for quick charging or boost charging the vehicle traction battery from a direct-current power outlet or other appropriate direct current source.

As used in the appended claims, the following words shall have the following definitions and meanings: the word "battery," when used in the singular, shall include the plural; and the word "motor," when used in the singular, shall include the plural.

While there has been described what are present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A battery charging system located on board an electric motor vehicle for enabling the vehicle traction battery to be recharged from conveniently located alternating-current power outlets wherein the battery charging system comprises:

converter means located on the electric motor vehicle for converting alternating-current power into direct-current power;

charge control means located on the electric motor vehicle for supplying direct-current energy from the converter means to the vehicle traction battery at a controlled rate;

plug-in type alternating-current connector means located on the electric motor vehicle for enabling an alternating-current power outlet located off of the vehicle to be easily connected to the converter means, such connector means including a pair of high voltage alternating-current contact members and a pair of low voltage alternating-current contact members;

switch means for selectively connecting one or the other but not both pairs of the alternating-current contact members to the converter means;

and voltage responsive automatic control means for determining which of the two alternating-current voltages is present and controlling the switch means to supply same to the converter means.

* * * * *